United States Patent [19]
Shirai

[11] Patent Number: 5,275,492
[45] Date of Patent: Jan. 4, 1994

[54] LINEAR MOTION SLIDE UNIT

[75] Inventor: Takeki Shirai, Ichikawa, Japan

[73] Assignee: THK Co., Ltd., Tokyo, Japan

[21] Appl. No.: 966,068

[22] PCT Filed: May 15, 1992

[86] PCT No.: PCT/JP92/00628

§ 371 Date: Jan. 15, 1993

§ 102(e) Date: Jan. 15, 1993

[87] PCT Pub. No.: WO92/20933

PCT Pub. Date: Nov. 26, 1992

[30] Foreign Application Priority Data

May 16, 1991 [JP] Japan .................. 3-141479

[51] Int. Cl.$^5$ .................. F16C 29/06; F16C 33/72
[52] U.S. Cl. .......................... 384/15; 384/45
[58] Field of Search ................ 384/15, 43, 44, 45

[56] References Cited

U.S. PATENT DOCUMENTS

| | | | |
|---|---|---|---|
| 4,253,709 | 3/1981 | Teramachi | 384/45 |
| 4,918,846 | 4/1990 | Tsukada | 384/15 |
| 5,087,130 | 2/1992 | Tsukada | 384/15 |
| 5,092,685 | 3/1992 | Tonogai | 384/15 |
| 5,102,235 | 4/1992 | Mugglestone | 384/45 |

Primary Examiner—Thomas R. Hannon
Attorney, Agent, or Firm—Kenyon & Kenyon

[57] ABSTRACT

A linear motion slide unit comprises a slider axially movably mounted on a guide rail by a number of rolling members. A sealing device comprises a pair of end plates mounted at both ends of the slider and a connection plate, connecting the pair of end plates, with the connection plate disposed between the slider and the guide rail in the axial direction. First sealing members are disposed on the end plates where the end plates face the guide rail. Second sealing members extend along the axial direction of the connection plate.

5 Claims, 4 Drawing Sheets

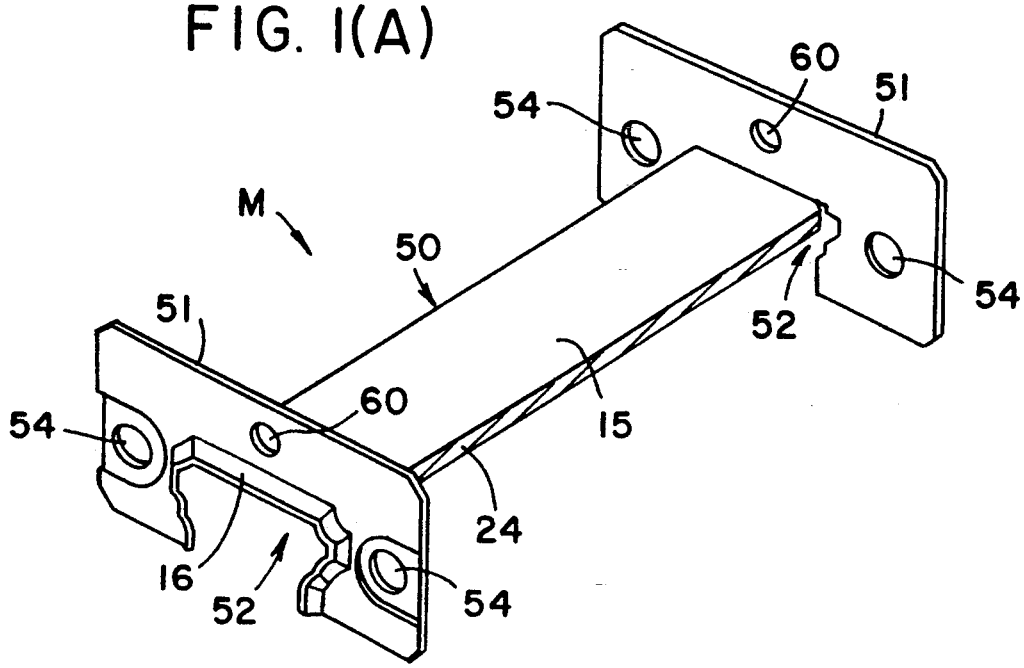
FIG. I(A)
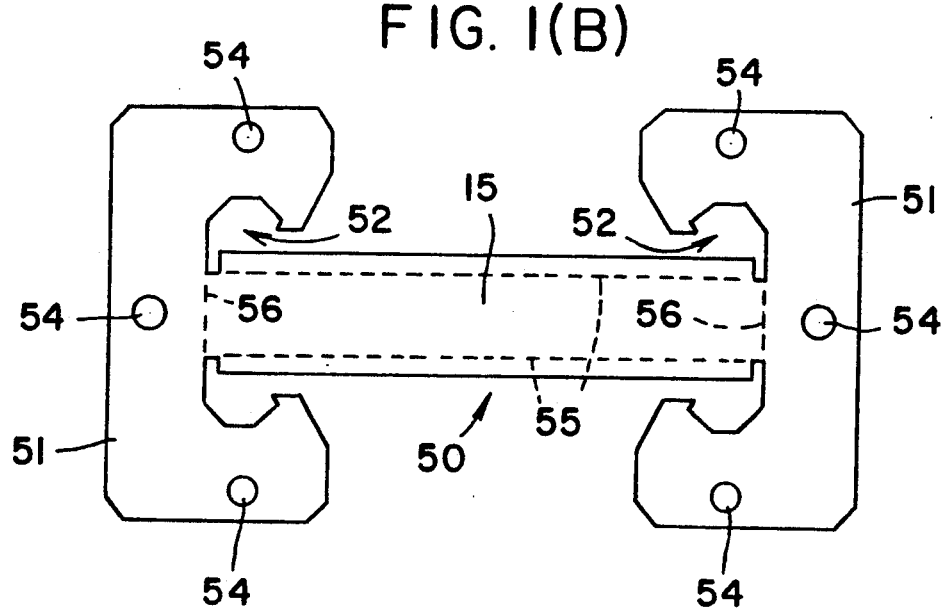
FIG. I(B)

LINEAR MOTION SLIDE UNIT

TECHNICAL FIELD

This invention relates to a sealing device of a linealy movable mechanism and a method of manufacturing the sealing device.

BACKGROUND ART

FIG. 4 shows a conventional linearly movable mechanism, in which first rolling member rolling grooves 102 are provided to both side surfaces 101 of a guide rail 100 and second rolling member rolling grooves 104 facing the first rolling grooves 101 are formed to a slider 103. The slider 103 is slidable on the guide rail 100 in the axial direction thereof through rolling members 105 disposed between the first and second rolling grooves 102 and 104.

A pair of end plates 103a are attached to both the axial ends of the slider 103, and end seals (first seal members) 106 are secured to end plates 110 disposed at the end faces of the end plates 103a. The end plates 103a and the end plates 110 are fastened fixedly to the slider 103 by means of screws 114. The end seals 106 are provided with sealing projections 107 slidably contacting the first rolling grooves 102. Upper seals (second sealing members) 111 extending axially are fixedly fastened to the slider 103 by means of screws 115 at portions corresponding to the upper surface 108 of the guide rail 100, and the upper seals 111 are constructed as members independent from the end seals 106.

In the conventional linearly movable mechanism of the structure described above, the rolling members 105 are rolled to thereby axially move the slider 103 on and along the guide rail 100. The sealing projections 107 prevent external cut chips or spatters from invading into the first and second rolling grooves 102 and 104. In addition, the upper seals 111 prevent foreign materials from invading into the first and second rolling grooves 102 and 104 through the upper surface 108 of the guide rail 100. However, in the conventional technology, the end seals 106 and the upper seals 111 are attached to the slider 103 independently with each other, thus performing less workability and reducing productionability.

DISCLOSURE OF INVENTION

The present invention is directed to a linear motion slide unit comprising:

a guide rail in which a first rolling member rolling groove extending in an axial direction is formed;

a slider in which a second rolling member rolling groove facing the first rolling member rolling groove is formed;

a number of rolling members disposed between the first and second rolling member rolling grooves to thereby axially movably support the slider on the guide rail; and a sealing device comprising a pair of end plates axially disposed at both ends of the slider, a connection plate disposed between the slider and the guide rail in the axial direction thereof and integrally connected to the paired end plates, first sealing members disposed at positions at which the end plates face the guide rail and second sealing members extending along the axial direction of the connection plate.

The slider has preferably substantially a ]-shape in cross section and the end plates each secured to the end portion of the slider has also a ]-shape in cross section.

The respective recessed portions of the end plates can be integrally connected with each other through the connection plate.

The first seal members are formed in a shape conforming with the outer peripheral shape of the guide rail.

Furthermore, the connection plate comprises a base portion and bent portions formed by bending both side edges of the base portion, and the second seal members are secured to the outer side surfaces of the bent portions.

Still furthermore, in a preferred embodiment, the second seal members are composed of lip portions inclining towards the centeral side of the guide rail.

The present invention further provides a method of manufacturing a sealing device of a linearly movable mechanism comprising the steps of forming a pair of end plates integrally with a plate-like body having a connection plate connected in an axial direction to the paired end plates, joining first seal members to the paired end plates, joining second seal members to the connection plate, and thereafter bending connected portions between the end plates and the connection plate in a widthwise direction, wherein the end plates and the connection plate is integrally formed, so that the first and second seal members are secured to the slider together in one assembling process.

Further, the sealing device can be constructed by the steps of forming a pair of end plates integrally with a plate-like body having a connection plate to which the paired end plates are axially connected, joining first seal members to the paired end plates and second seal members to the connection plate along the axial direction, and thereafter bending connected portions between the end plates and the connection plate in a widthwise direction.

As described above, according to the present invention, the first and second seal members are secured to the slider together by one assembling process, thus improving the assembling workability, and hence, improving the production efficiency of the linearly movable mechanisms.

BRIEF DESCRIPTION OF THE DRAWINGS

FIG. 1(A) is a perspective view of a sealing device of the present invention before the attachment to a slider; FIG. 1(B) is a plan view of a punched plate according to the present invention.

BEST MODES FOR EMBODYING THE INVENTION

Figure 2A:
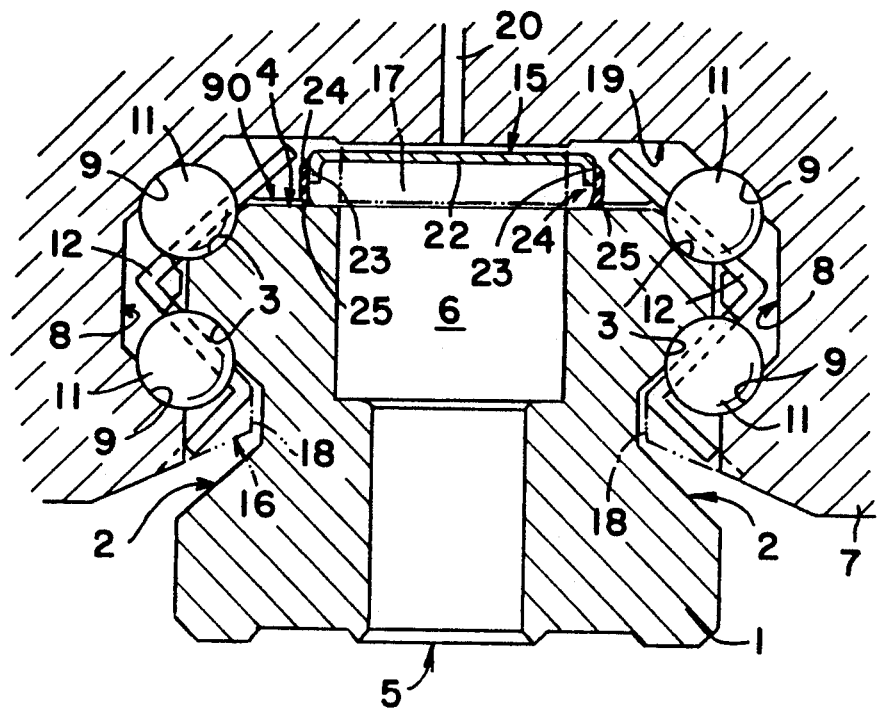
FIG. 2(A) is a front sectional view showing the sealing device of the present invention.
Figure 2B:
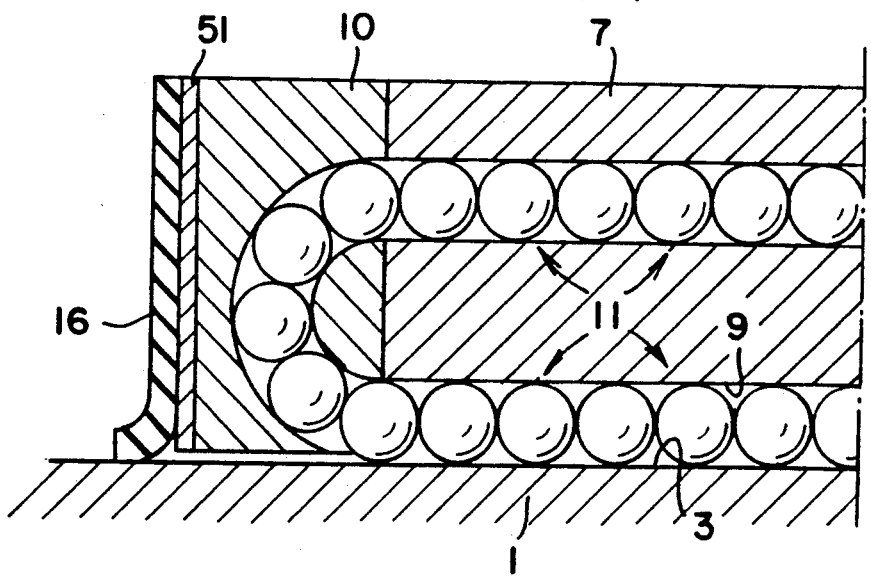
FIG. 2(B) shows a second rolling member rolling groove according to the present invention and is a sectional view taken along the line 2(B)—2(B) in FIG. 3.
Figure 3:
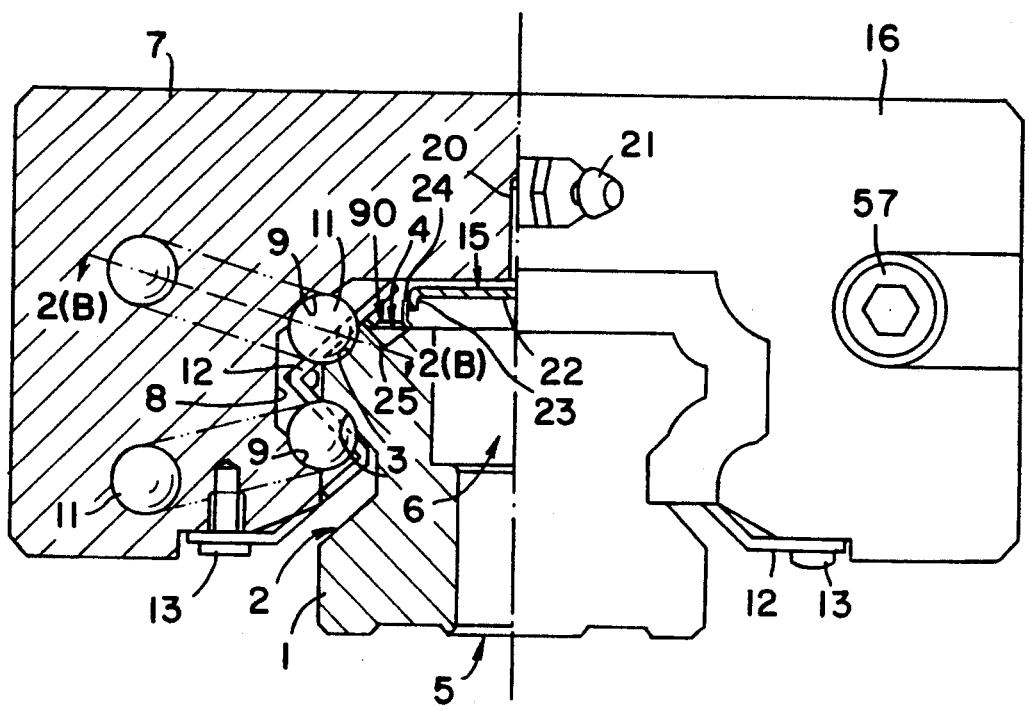
FIG. 3 is a front view, partially cut away, of the sealing device of a linearly movable mechanism according to the present invention.
Figure 4A:
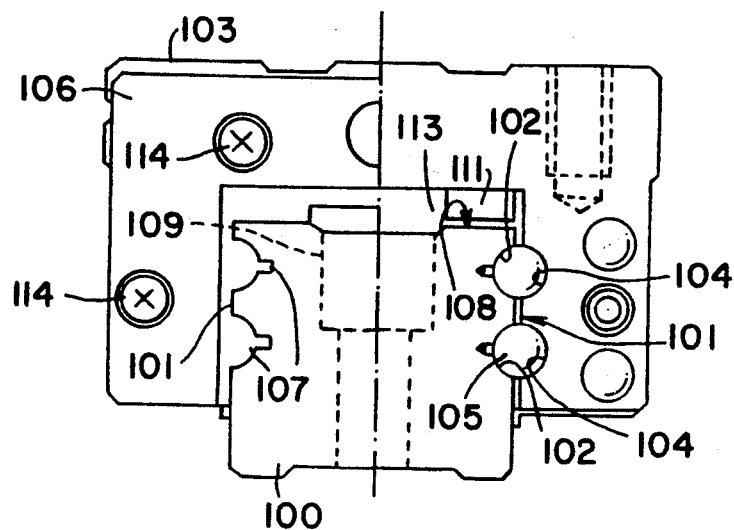
FIG. 4(A) is a front view, partially cut away, of a sealing device of a linearly movable mechanism of a conventional structure.
Figure 4B:
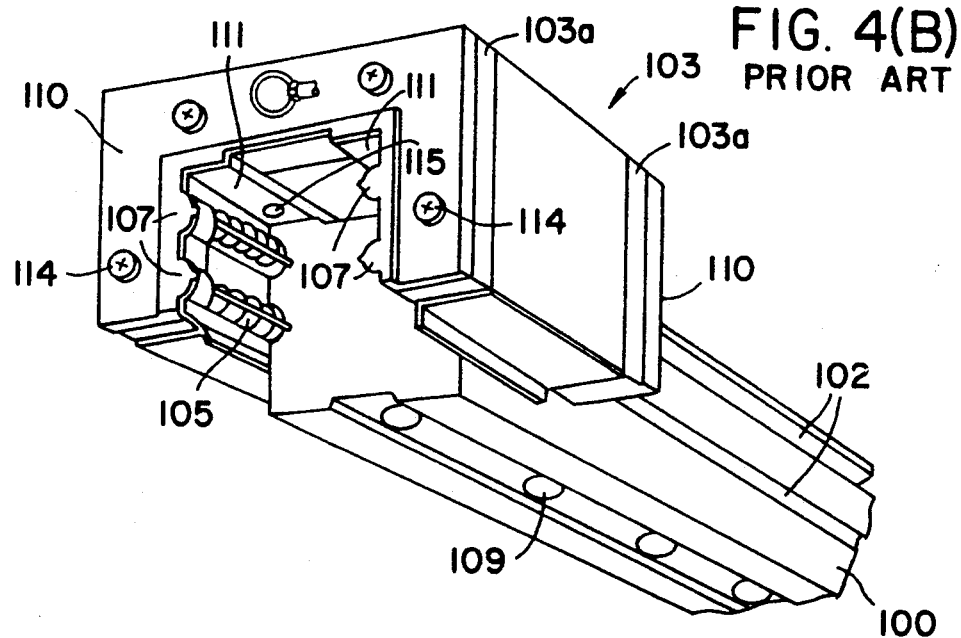
FIG. 4(B) is a perspective view of FIG. 4(A)
Figure 4C:
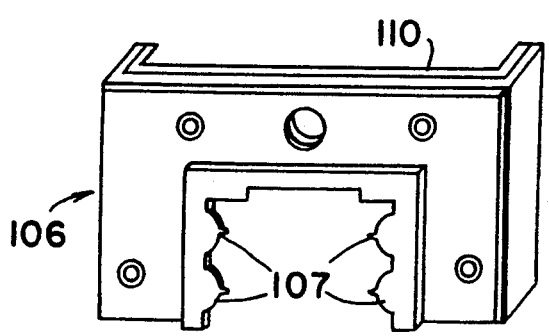
FIG. 4(C) is a perspective view of an end seal secured to an end plate of a conventional structure.

The present invention will be described hereunder with reference to the accompanying drawings. FIGS. 2(A), 2(B), and 3 show a guide mechanism of a linear motion to which the present invention is applied. In these figures, reference numeral 1 denotes a guide rail having a predetermined axial length, and the guide rail 1, and two rows of first rolling member rolling grooves 3 are formed to both side surfaces 2 of the guide rail 1 in a vertically aligned attitude in the illustration, each of the first rolling grooves 3 having an arcuate cross section and extending in the axial direction of the guide rail 1. A plurality of attachment holes 6 are formed to the central portion in the widthwise direction of the guide rail 1 with predetermined spaces therebetween in the axial direction thereof for inserting bolts, not shown, from the upper surface side 4 to the lower surface side 5. The upper surface 4 of the guide rail 1 is formed to be flat.

A slider 7 having substantially a ]-shaped cross section is mounted on the guide rail 1. The inner side surfaces 8 of the ]-shaped slider 7 face the side surfaces of the guide rail 1 and two rows of second rolling member rolling grooves 9 are formed to both the inner surfaces 8 of the sides of the slider 7 so as to extend in the axial direction thereof. End plates 10 each having a sectional shape substantially similar to that of the slider 7 are attached to both the axial end surfaces of the slider 7.

Each of the second rolling grooves 9 is formed circularly through the insides of the slider 7 and the end plate 10, and a number of balls 11 (such as steel balls) as the rolling members are disposed between the second rolling grooves 9 and the first rolling grooves 3. According to the structure described above, the slider 7 is movable on the guide rail 1 along the axial direction thereof.

A sealing device M shown in FIG. 1(A) is attached to the slider 7, the sealing device M being described hereunder. Reference numeral 50 is a plate body made of a metal material, for example, which is composed of a pair of end plates 51 to be attached perpendicularly to both the ends of the end plate 10, each of the end plates 51 having a ]-shaped section and a horizontal connection plate 15 connecting ]-shaped recesses 52 of both the end plates 51 at its both axial ends. End seals as first sealing members 16 made of a rubber-like elastic material (nitrile rubber, styrene rubber, butyl rubber, or the like) are bonded to the surfaces of the paired end plates 51 such as sintering manner. The end seals 16 serve to seal a space between the slider 7 and the upper surface 4 of the guide rail 1 and the inner peripheral surface of each of the end seals 16 has a shape similar to the outer peripheral surface of the guide rail 1. The end seals 16 are formed on the entire surfaces of the end plates 51, but they may be applied locally only on the surfaces of the recesses 52. Screw insertion holes 54 and insertion holes 60 for grease nipples 21 are formed to the end plates 51 at portions opposing to each other, respectively.

The connection plate 15 has a cross sectional shape as shown in FIG. 2(A) and is composed of a base portion 22 having a width of a size more than an opening diameter of the attachment hole 6 and bent portions 23 formed by bending downward both edge portions of the base portion 22. A pair of inner seals 24 as second sealing members are bonded such as in sintering manner to the outside surfaces of the bent portions 23. The inner seals 24 are formed of a rubber-like elastic material (nitlie rubber, styrene rubber, butyl rubber, or the like), and are provided with lip portions 25 at the lower end portions, as viewed, thereof so as to face each other, that is, to incline towards the attachment hole 6. The lip portions 25 contact the upper surface 4 of the guide rail 1 in the axial direction thereof with a predetermined contacting pressure with respect to the space between the attachment hole 6 and the first rolling grooves 3, thus forming a sealing surface.

The sealing device M will be manufactured in a manner described hereunder with reference to FIG. 1(B).

The plate body 50 is first formed from a plate member by means of a pressing machine, not shown, so as to have a pair of end plates 51 and the connection plate 15 integrally formed to the end plates 51 so that the end plates 51 are positioned at both the axial ends of the connection plate 15. The thus formed plate body 50 is placed in a cavity of a mold, not shown, and a rubber formation material is then fed into the cavity. The end seals 16 are sintered or baked on portions near the recesses 52 of the end plates 51 and the inner seals 24 are also sintered or baked to the bent portions 23 of the connection plate 15 along the axial direction thereof. Thereafter, the plate body 50 is separated from the mold and the plate body 50 is bent along folding lines 55 and 56, thus completing the sealing device.

Furthermore, a passage 20 for supplying a lubricant is formed to the slider 7 so as to communicate with a space between the inner lower surface 19 of the slider 7 and the upper surface 4 of the guide rail 1, and the passage 20 is also communicated with the grease nipples 21 connected to the end surface sides of the end seals 16.

A plate 12 for holding the balls 11 is provided for the inside surface 8 of the slider 7 and the plate 12 is fastened to the lower surface of the slider 7 by means of bolts 13.

The slider of the structure described above is assembled with the sealing device M in the following manner.

The end plates 10 are closely contacted to the corresponding surfaces of the end plates 51 and then placed on the connection plate 15, and thereafter, the plate body 50 is assembled with the slider 7 from the lower side thereof and screws 57 are inserted into the insertion holes 54 and fastened thereto, thus completing the assembling working. In this assembling, the formation of femail threads on both the end surfaces of the slider 7 is a matter of natural. According to the present invention, the end seals 16 and the inner seals 24 are together secured to the slider at one assembling working, thus improving the workability and enhancing the productivity of the linearly movable mechanisms.

The sealing device M operates as follows.

The slider 7 can be freely slidable in a linearly reciprocal manner on the guide rail 1 along the axial direction thereof through the rolling motion of the balls 11 disposed between the first and second rolling grooves. Then, the end seals 16 slidably contact the upper surface 4 of the guide rail 1 and the both the side surfaces 2 thereof to construct the first sealing surface, and the inner seals 24 slidably contact the upper surface 4 of the guide rail 1 to form the second sealing surface between them and the end seals 16. Accordingly, the invasion of the cut chips or foreign materials such as spatters into the space between the upper surface 4 of the guide rail 1 and the inner lower surface 19 of the slider 7 and the space between the side surfaces 2 of the guide rail 1 and the inner side surfaces 8 of the slider 7, that is, the invasion into the first and second rolling grooves 3 and 9, can be prevented. Furthermore, even if such chips or foreign materials be invaded thereinto through the space between the upper surface 4 of the guide rail 1 and the inner lower surface 19 of the slider, the chips or foreign materials can be prevented from invading into the first and second rolling grooves 3 and 9 by the presence of the second sealing surface formed between the inner seals 24 and the upper surface 4 of the guide rail 1. Accordingly, the preferred ball rolling condition can be achieved, thus performing the stable linear motion of the slider 7. Furthermore, since the inner seals 24 are slidably contacted to the upper surface 4 of the guide rail 1 in the axial direction, the sliding resistance with respect to the upper surface 4 of the guide rail 1 can be made small, thus being difficult to cause wearing thereof.

During the operation described above, the lubrication oil, i.e. grease, fed from the grease nipple 21 is fed into a portion 90 between the slider 7 and the guide rail 1 through the supply passage 20 as arrowed in FIG. 2A. In this operation, since the inner seals 24 contact to the upper surface 4 of the guide rail 1, the displacement of the grease to the central portion of the upper surface 4 can be limited. Accordingly, the grease fed into the portion 90 can be effectively fed towards the first and second ball rolling grooves 3 and 9 from the outside of the upper surface 4 of the guide rail 1, thus the sliding surface being well lubricated. Furthermore, the lip portions 25 of the inner seals 24 are inclined towards the central side of the upper surface 4, so that the used and degraded grease lifts up the lip portions 25 and is removed to the central side of the upper surface 4. However, when a pressure is applied to the lip portions 25 from the central side of the upper surface 4 of the guide rail 1, the surface contacting pressure further increases, thus improving the sealing effect.

In the described embodiment, the balls are referred to as the rolling members, but other rolling members such as rollers may be utilized.

Field of Industrial Usage

As described above, the sealing device of the present invention can be utilized for linearly movable mechanisms for machine tools, measuring devices, medical equipments and the like.

Particularly, since the first and second sealing members are together fixed to the slider through one assembling working only by attaching the plate body to the slider, the present invention is applicable particularly for the assembling working to the linearly movable guide mechanisms.

I claim:

1. A linear motion slide unit comprising:
    a guide rail in which a first rolling member rolling groove extending in an axial direction is formed;
    a slider in which a second rolling member rolling groove facing the first rolling member rolling groove is formed;
    a number of rolling members disposed between the first and second rolling member rolling grooves to thereby axially movably support the slider on the guide rail; and
    a sealing device comprising a pair of end plates axially disposed at both ends of the slider, a connection plate disposed between the slider and the guide rail in the axial direction thereof and integrally connected to the paired end plates, first sealing members disposed at positions at which the end plates face the guide rail and second sealing members extending along the axial direction of the connection plate.

2. A linear motion slide unit according to claim 1, wherein said slider has substantially a ]-shaped cross section and said end plates have substantially ]-shaped cross sections, respectively, to provide recessed portions, said recessed portions of said end plates being connected integrally through the connection plate.

3. A linear motion slide unit according to claim 1, wherein said first sealing members each has a shape similar to an outer peripheral shape of the guide rail.

4. A linear motion slide unit according to claim 1, wherein said connection plate comprises a base portion and bent portions formed by bending both edge portions of the base portion and said second sealing members are fixed to outer side surfaces of the bend portions.

5. A linear motion slide unit according to claim 1, wherein said second sealing members are formed by lip portions inclined towards a central side of the guide rail.

* * * * *